(12) United States Patent
Dadhich et al.

(10) Patent No.: US 11,455,158 B2
(45) Date of Patent: Sep. 27, 2022

(54) CONFIGURABLE FRAMEWORK FOR PROCESSING MULTI-CHANNEL ELECTRONIC NETWORK REQUESTS

(71) Applicant: BANK OF AMERICA CORPORATION, Charlotte, NC (US)

(72) Inventors: Deepali Dadhich, Westlake Village, CA (US); ChellaPrabhu Andrew Mariadoss, Irvine, CA (US); Richa Sachdeva, Haryana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 136 days.

(21) Appl. No.: 16/922,309

(22) Filed: Jul. 7, 2020

(65) Prior Publication Data

US 2022/0012035 A1  Jan. 13, 2022

(51) Int. Cl.
    *G06F 9/445* (2018.01)
    *G06F 8/65* (2018.01)
    *H04L 67/00* (2022.01)
    *G06V 10/98* (2022.01)
    *G06V 30/10* (2022.01)

(52) U.S. Cl.
    CPC ............. *G06F 8/65* (2013.01); *G06V 10/993* (2022.01); *H04L 67/34* (2013.01); *G06V 30/10* (2022.01)

(58) Field of Classification Search
CPC ........ G06F 8/65; G06V 10/993; G06V 30/10; H04L 67/34
USPC .......................................... 717/168–178, 122
See application file for complete search history.

(56) References Cited

U.S. PATENT DOCUMENTS

2019/0108044 A1* 4/2019 Coven ..................... G06F 9/542

* cited by examiner

*Primary Examiner* — Chuck O Kendall
(74) *Attorney, Agent, or Firm* — Moore & Van Allen PLLC; Nicholas C. Russell

(57) ABSTRACT

Embodiments of the present invention provide a system for processing multi-channel electronic requests. The system is typically configured for generating a configurable framework, creating a package of the configurable framework, allowing a resource entity system of an entity to download the configurable framework, identifying initiation of download of the configurable framework, causing the user interface to input one or more configurable parameters associated with an application present in the resource entity system, receiving the one or more configurable parameters, and integrating the configurable framework with the application, wherein the configurable framework processes one or more multi-channel electronic requests associated with the application based on the one or more configurable parameters.

17 Claims, 3 Drawing Sheets

CONFIGURABLE FRAMEWORK FOR PROCESSING MULTI-CHANNEL ELECTRONIC NETWORK REQUESTS

FIELD

The present invention relates to a configurable framework that is capable of integrating with any application of an entity to process incoming electronic requests of the application.

BACKGROUND

Typically, every application within an entity may need associates that manually process incoming electronic resources. However, such manual processing is prone to errors and ultimately results in audit issues that decrease the efficiency of applications. Thus, there is a need for a system that efficiently processes electronic resources received from multiple channels.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the present invention address the above needs and/or achieve other advantages by providing apparatuses (e.g., a system, computer program product and/or other devices) and methods for processing multi-channel electronic requests. The present invention generates a configurable framework, creates a package of the configurable framework, allows a resource entity system of an entity to download the configurable framework, identifies initiation of download of the configurable framework, causes the user interface to input one or more configurable parameters associated with an application present in the resource entity system, receives the one or more configurable parameters, and integrates the configurable framework with the application, wherein the configurable framework processes one or more multi-channel electronic requests associated with the application based on the one or more configurable parameters.

In some embodiments, the present invention processes the one or more multi-channel requests based on: receiving an electronic resource associated with an electronic request from at least one channel, wherein the electronic resource is associated with the application of the entity, in response to receiving the electronic resource, indexing the electronic resource, identifying the one or more configurable parameters associated with the application, processing the electronic resource based on the one or more configurable parameters, identifying that the electronic resource is associated with an existing electronic request based on processing the electronic resource, in response to identifying that the electronic resource is associated with an existing electronic request, routing the electronic resource to an associate processing the existing electronic request, and automatically pushing updates associated with the electronic resource to one or more entity systems of the entity.

In some embodiments, the present invention identifies that processing of the electronic resource is unsuccessful and in response to identifying that the processing of the electronic resource is unsuccessful, generate a data exception and retry processing the electronic resource.

In some embodiments, the one or more configurable parameters comprise a first flag for optical character recognition, a threshold value for confidence level associated with the optical character recognition, and a second flag for manual review of the electronic resource.

In some embodiments, processing the electronic resource comprises identifying that the first flag for the optical character recognition is positive, performing optical character recognition on the electronic resource, calculating the confidence level of the optical character recognition, determining that the confidence level for the optical character recognition is below the threshold value, in response to determining that the confidence level is below the threshold value, identifying that the second flag for the manual review is positive, and routing the electronic resource to the associate for the manual review.

In some embodiments, the one or more configurable parameters are received from an associate associated with the application, wherein the one or more configurable parameters are specific to the application.

In some embodiments, the present invention integrates the configurable framework with any existing applications of the entity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
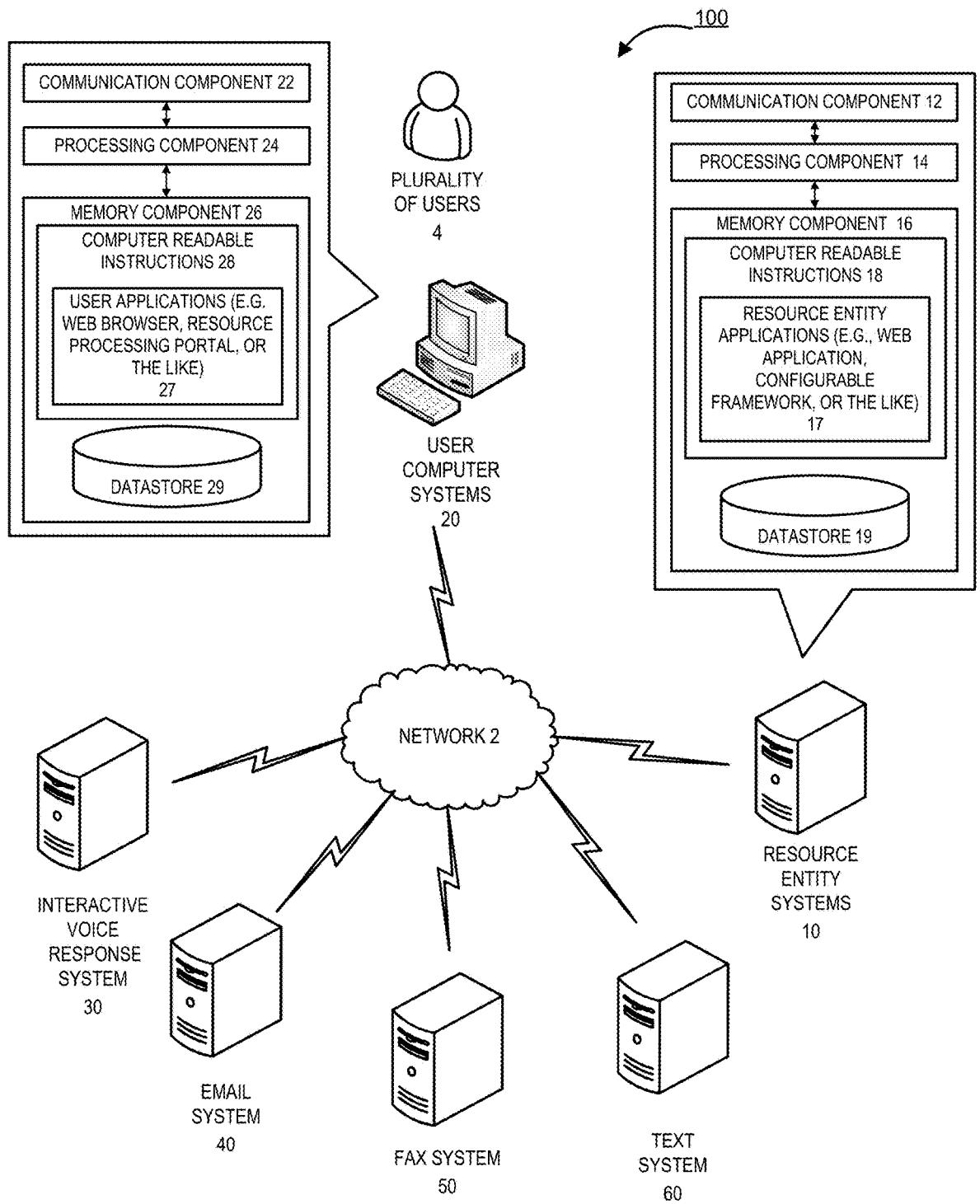

Having thus described embodiments of the invention in general terms, reference will now be made to the accompanying drawings, where:

FIG. 1 illustrates a block diagram illustrating a system environment for processing multi-channel electronic requests, in accordance with embodiments of the present invention.

Figure 2:
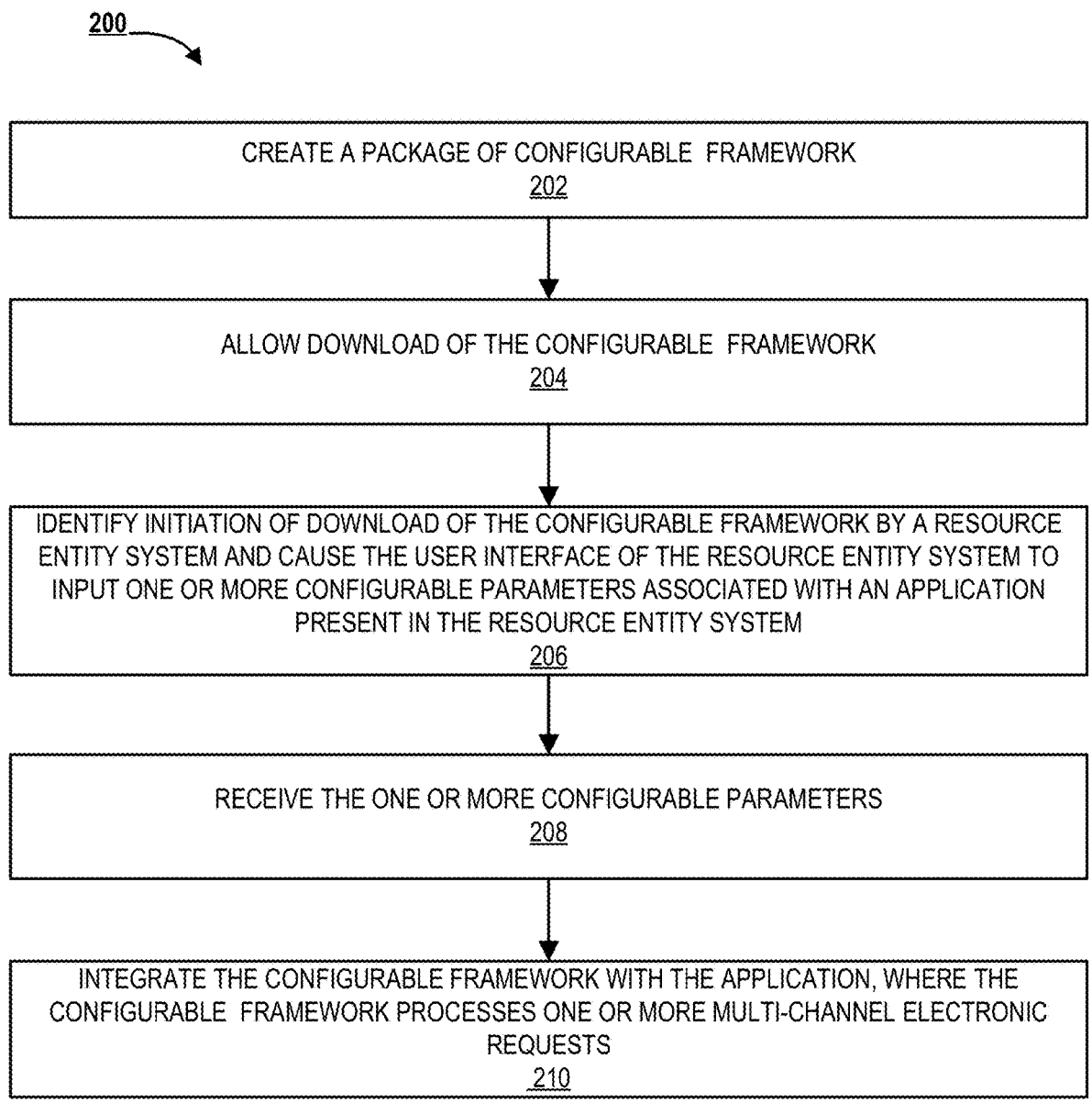

FIG. 2 is a flowchart illustrating a process flow for allowing the configurable framework to be integrated with an application in the resource entity system of FIG. 1, in accordance with embodiments of the present invention.

Figure 3:
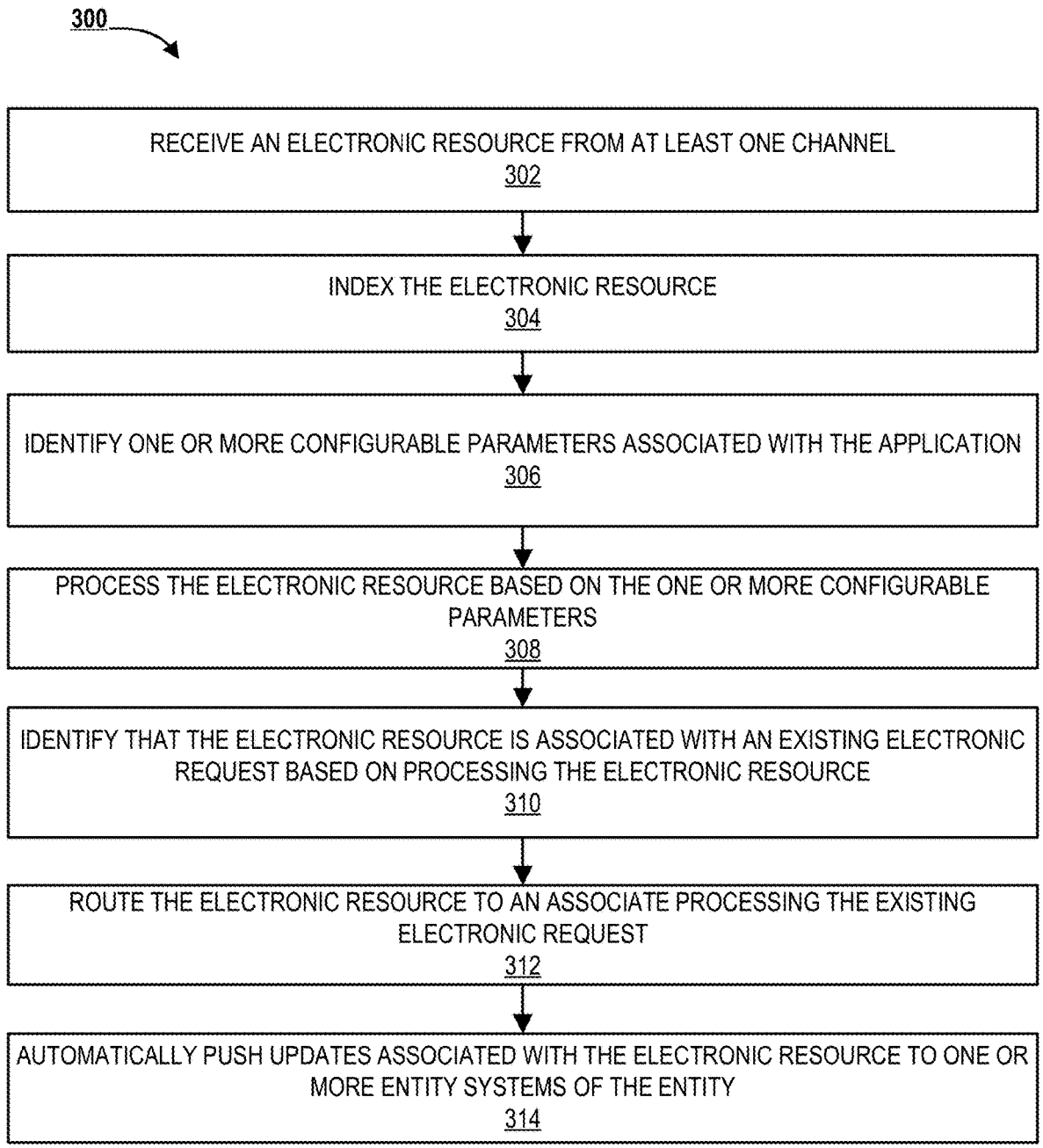

FIG. 3 is a flowchart illustrating a process flow for processing multi-channel electronic requests associated with the application, in accordance with embodiments of the present invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Typically, each application may receive electronic requests from one or more channels and to process the electronic requests there should be enough personnel in place to handle the incoming requests. Such a process may be labor intensive and may be prone to human errors which is not desirable for audit purposes. Moreover, each user processing the electronic request may not maintain the same format or follow the same procedure and in some instances may not process an electronic document using a generic procedure, which makes tracking of the electronic document difficult which will in turn result in discrepancies. As such, there exists a need for a system in place to receive and process incoming requests of one or more applications associated with the entity. However, if a system supporting such process were to be developed for each application individually, it may not be efficient and each such system would consume a lot of memory space of resource entity systems. Therefore, the system of the present invention provides a configurable framework that can be easily integrated with any application within the entity just by changing one or more configurable parameters. The configurable framework of the present invention is generated using an automation platform. An example of supporting creation of such a framework is the Pega® Platform, which is provided by Pegasystems Inc. of Boston, Mass. It provides for an adaptive, cloud-architected software that empowers people to rapidly deploy, and easily extend and change application to meet strategic business needs, providing capabilities in content and resource management and business process management (BPM). The current invention leverages capabilities of the Pega® Platform to generate a framework that processes electronic requests associated with applications of the entity.

The current invention provides a configurable framework for processing electronic requests associated with applications of the entity. The framework may be reused by multiple applications within an entity, without having a user to develop a code for each of the applications separately. The present system processes electronic requests associated with multiple applications within an entity effectively because it enables users (or an entity) to track the processing of the incoming requests. This configuration eliminates the need to (i) perform a different process for each application within an entity and (ii) allocate a resource (e.g., system) specifically for each application within the entity to perform the corresponding process.

In accordance with embodiments of the invention, the terms "resource entity" or "entity" may include any organization that uses, develops, and/or controls application software to perform one or more organizational activities. In an exemplary embodiment, the resource entity may be an organization that processes financial transactions including, but not limited to, banks, credit unions, savings and loan associations, card associations, settlement associations, investment companies, stock brokerages, resource management firms, insurance companies and the like. In another exemplary embodiment, the resource entity may be a non-financial institution. Furthermore, embodiments of the present invention use the term "end user" or "customer." It will be appreciated by someone with ordinary skill in the art that the user may be a customer of the entity or a potential customer of the entity or an employee of the financial institution. Embodiments of the present invention use the term "associate" or "user." In some embodiments, the end user may be an associate. It will be appreciated by someone with ordinary skill in the art that the associate may be an employee of the entity.

Many of the example embodiments and implementations described herein contemplate interactions engaged in by a user with a computing device and/or one or more communication devices and/or secondary communication devices. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user, second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like.

FIG. 1 illustrates a system environment 100 for processing multi-channel electronic requests, in accordance with embodiments of the invention. As illustrated in FIG. 1, one or more resource entity systems 10 are operatively coupled, via a network 2, to user computer systems 20, an interactive voice response system 30, an email system 40, a fax system 50, a text system 60, and/or one or more other systems (not illustrated). The interactive voice response system 30, the email system 40, the fax system 50, and the text system 60 are channels that allow customers of the entity associated with the resource entity systems 10 to submit one or more electronic resources or electronic requests to an application present in the resource entity systems 10. In some embodiments, the system environment 100 may comprise any other systems that allow customers to submit electronic resources or electronic requests to an application existing in the resource entity systems 10. In this way, the user 4 (e.g., one or more associates, employees, agents, contractors, sub-contractors, third-party representatives, or the like), through a user application 27 (e.g., web browser, resource processing portal, or the like), may access resource entity applications 17 (e.g., web application, configurable framework, customer record maintenance application, transaction processing application, or the like). The resource entity applications 17 may be any application developed, utilized, or controlled by the resource entity to perform one or more organizational activities. In some embodiments, the resource entity system 10 is the system of the present invention that provides the configurable framework. Specifically, the configurable framework provided by the present invention is capable of integrating with any of the other resource entity applications 17. The configurable framework provided by the present invention as explained above processes multi-channel electronic requests and incoming electronic resources. In some embodiments, the system of the present invention may be an independent system that provides the configurable framework to the resource entity system 10. In such embodiments, the system of the present invention may comprise one or more processing devices operatively coupled to the one or more memory devices and configured to execute computer readable code stored in the one or more memory devices.

In some embodiments, the interactive voice response system 30, the email system 40, the fax system 50, the text system 60 may be a part of the resource entity systems 10. In some embodiments, the interactive voice response system 30, the email system 40, the fax system 50, the text system 60 may be independent systems as shown in FIG. 1. In such embodiments, the resource entity systems 10 maintain or control the interactive voice response system 30, the email system 40, the fax system 50, and the text system 60. The interactive voice response system 30, the email system 40, the fax system 50, the text system 60 may comprise one or more processing devices operatively coupled to the one or more memory devices and configured to execute computer readable code stored in the one or more memory devices.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the resource entity systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the user computer systems 20, the interactive voice response system 30, the email system 40, the fax system 50, the text system 60 and/or other systems. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the resource entity systems 10 comprise computer-readable instructions 18 stored in the memory component 16, which in one embodiment includes the computer-readable instructions 18 of the resource entity application 17 (e.g., web application, configurable framework, customer record maintenance application, transaction processing application, or the like). In some embodiments, the one or more memory components 16 include one or more data stores 19 for storing data related to the resource entity systems 10, including, but not limited to, data created, accessed, and/or used by the resource entity applications 17. The independent interactive voice response system 30, the email system 40, the fax system 50, the text system 60 may include one or more memory components, wherein the one or more memory components may include instructions associated with the system of the present invention.

As illustrated in FIG. 1, plurality of users 4 may access the resource entity application 17, or other applications, through a user computer system 20. The user computer system 20 may be a desktop, mobile device (e.g., laptop, smartphone device, PDA, tablet, or other mobile device), or any other type of computer that generally comprises one or more communication components 22, one or more processing components 24, and one or more memory components 26. The plurality of users may be any employees of the resource entity system. For example, the plurality of users may be application program developers, business analysts, and/or the like. In addition, the system environment 100 may also include user computer systems of one or more end users (e.g., customers of the entity, or internal employees of the entity), wherein the one or more end users access the application software deployed by the resource entity system 10 and/or the system of the present invention on the user computer systems.

The one or more processing components 24 are operatively coupled to the one or more communication components 22 and the one or more memory components 26. The one or more processing components 24 use the one or more communication components 22 to communicate with the network 2 and other components on the network 2, such as, but not limited to, the other user computer systems, the interactive voice response system 30, the email system 40, the fax system 50, the text system 60, and/or other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with a user of the plurality of users 4. In one embodiment of the present invention, the configurable framework in resource entity system 10 may provide a resource processing portal in the user computer systems 20 to allow the plurality of users 4 to access information associated with processing of electronic requests.

As illustrated in FIG. 1, the user computer systems 20 may have computer-readable instructions 28 stored in the one or more memory components 26, which in one embodiment includes the computer-readable instructions 28 for user applications 27, such as resource processing portal, a web browser or other apps that allow the user to take various actions, including allowing the user to access applications located on other systems, or the like. In some embodiments, the user utilizes the user applications 27, through the user computer systems 20, to access the resource entity applications 17 to access information associated with processing of electronic requests and/or to provide minimal amount of input to the system.

Referring now to FIG. 2, a general process flow 200 is provided for allowing the configurable framework to be integrated with an application in the resource entity system 10 of FIG. 1. Referring to block 202 through 210 of FIG. 2, as shown in block 202, the system creates a package of configurable framework, where the configurable framework is exclusively designed to process incoming resource requests associated with one or more applications. The configurable framework comprises one or more executable program codes that are configured to process incoming resource requests associated with the one or more applications.

As shown in block 204, the system allows download of the configurable framework. As shown in block 206, the identifies initiation of download of the configurable framework by a resource entity system and causes the user interface of the resource entity system to input one or more configurable parameters associated with an application present in the resource entity system.

As shown in block 208, the system receives the one or more configurable parameters. The one or more configurable parameters are associated with processing of the electronic requests. The one or more configurable parameters may comprise first flag for optical character recognition, a threshold value for confidence level associated with the optical character recognition, and a second flag for manual review of the electronic resource. Each of these configurable parameters are explained in detail in FIG. 3. In some embodiments, the one or more configurable parameters are received from the resource entity system. In some embodiments the one or more configurable parameters are presented by a user 4 (e.g., an associate, application owner, or the like) via the user computing system 20.

As shown in block 210, the system integrates the configurable framework with the application, where the configurable framework processes one or more multi-channel electronic requests. The system may integrate the configurable framework with the application by importing the one or more codes present in the package of the configurable framework into the executable codes of the application.

Referring now to FIG. 3, a general process flow 300 is provided processing multi-channel electronic requests associated with the application. Referring to block 302 through 314 of FIG. 3, as shown in block 302, the configurable framework receives an electronic resource associated an electronic request from at least one channel. The at least channel may include, but is not limited to, interactive voice response system 30, email system 40, fax system 50, text system 60, mailing system (not shown), or the like. In some embodiments, the at least one channel may be a mailing system which intakes paper mails. Electronic request may be any application specific request. For example, the electronic request may be associated with online banking application, where the electronic request may be associated with change of customer address. In such a case, the customer may submit an electronic document that may be a supporting document for the change of address. In some embodiments, the electronic resource accompanies the electronic request. In some embodiments, the electronic resource may not accompany the electronic request. The electronic resources may include, but are not limited to, photos, documents, files, or the like.

As shown in block 304, the configurable framework indexes the electronic resource. The configurable framework may create an index or a unique identifier for the electronic resource so that the electronic resource may be tracked as it progresses or propagates into multiple resource entity systems 10. In some embodiments, the configurable framework may create an index and may insert the index into metadata of the electronic resource, where the metadata moves along with the electronic resource. The index allows the system of the present invention and the resource entity systems 10 to track the movement of the electronic resource within the entity. For example, the electronic resource may be transferred to multiples users (e.g., application analysts, application owners, or the like) or multiple applications/resource entity systems within the entity. In such instances, the index that is associated with the electronic resource allows the system to track the movement and in some instances, track the modifications performed on the electronic resource. The index may be an application specific index that allows the configurable framework of the present invention and the resource entity systems 10 to identify that the electronic resource belongs to a particular application.

As shown in block 306, the configurable framework identifies one or more configurable parameters associated with the application. The one or more configurable parameters as explained above may comprise first flag for optical character recognition, a threshold value for confidence level associated with the optical character recognition, and a second flag for manual review of the electronic resource. The first flag may be positive if the application needs optical character recognition on the incoming electronic resource. The package of the configurable framework comprises one or more codes for performing optical character recognition and providing a confidence score associated with the optical character recognition. In the case where the confidence level associated with the optical character recognition needs to be considered by the application, the threshold value for the confidence level is received from the resource entity system 10 or the user 4 as explained in block 208 of FIG. 2. The second flag may be positive if the application needs a user to perform a manual review of the electronic resource, should the confidence level of the optical character recognition fall under the threshold value.

As shown in block 308, the configurable framework processes the electronic resource based on the one or more configurable parameters. Processing of the electronic resources depends on whether flags associated with the application are positive or not. In one embodiment, the configurable framework identifies that the first flag for the optical character recognition is negative and may automatically redirect the electronic resource to a resource entity system and/or an associate (e.g., application analyst) via the user computing system 20 and the resource processing portal provided by the configurable framework of the present invention. In one embodiment, the configurable framework identifies identifying that the first flag for the optical character recognition is positive and performs optical character recognition on the electronic resource. In such an embodiment, the configurable framework calculates the confidence level of the optical character recognition. For example, when the incoming electronic resource is associated with change of address, the system optical character recognition to identify one or more details in the electronic resource with 98% confidence. The configurable framework after performing optical character recognition, determines whether the confidence level is higher than the threshold value. In the case, where the confidence level is higher than the threshold value, the process flow proceeds to block 310. In the case where the confidence level for the optical character recognition is below the threshold value, the configurable framework determines whether the second flag for the manual review is positive or not. If the second flag is negative, the process flow proceeds to block 310. If the second flag is positive, the configurable framework routes the electronic resource to the associate for the manual review. In some embodiments, some applications may not require exact details with 100% confidence in the electronic resources, in such cases, the second flag is negative. In some embodiments, where applications require exact details (e.g., check processing applications), the second flag is positive. In some embodiments, the configurable framework automatically identifies flags based on the type of application. For example, if the application is a check processing application, the system may automatically determine that the second flag should be positive. In some embodiments, where the configurable framework is unable to process the electronic resource, the configurable framework generates a data exception and retries processing the electronic resource instead of ending the process flow. For example, if an unexpected error (e.g., because of network issues, hardware issues, or the like) has occurred while processing the electronic resource, the system generates a data exception and tries processing the electronic resource.

As shown in block 310, the configurable framework identifies that the electronic resource is associated with an existing electronic request based on processing the electronic resource. Based on processing the electronic resource, the configurable framework may determine that the one or more details in the electronic resource correspond to an existing electronic request. For example, the configurable framework receives supporting documentation for address change for a customer, where the documentation may comprise first name, last name, and date of birth of the customer, the configurable framework may determine that the documentation is associated with an existing customer and may move the documentation to the personal file of the customer. In another example, the configurable framework receives a snapshot of an error log encountered by a end user, where the snapshot may comprise details about type of error. The configurable framework may determine that an existing ticket to resolve the same error exists and may determine that the incoming electronic resource is associated with the existing ticket.

As shown in block 312, the configurable framework routes the electronic resource to an associate processing the existing electronic request. Continuing with the previous example, the system may determine that the incoming electronic resource is associated with the existing ticket and may route the electronic resource to a technical support representative. In some embodiments, the configurable framework may route the electronic resource to another system that is configured to handle the processing of the electronic requests.

As shown in block 314, the configurable framework automatically pushes updates associated with the electronic resource to one or more entity systems of the entity. The system may automatically update one or more entity system with the details in the electronic resource and may store a copy of the electronic resource.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein. In some embodiments, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for processing multi-channel electronic network requests, the system comprising:
   one or more memory devices having computer readable code stored thereon;
   one or more processing devices operatively coupled to the one or more memory devices, wherein the one or more processing devices are configured to execute the computer readable code to:
   generate a configurable framework;
   create a package of the configurable framework, wherein the package comprises one or more codes;
   allow a resource entity system of an entity to download the configurable framework;
   identify initiation of download of the configurable framework;
   cause a user interface to prompt input of one or more configurable parameters associated with an application present in the resource entity system, wherein the one or more configurable parameters comprise:
   a first flag for optical character recognition;
   a threshold value for confidence level associated with the optical character recognition; and
   a second flag for manual review of an electronic resource associated with the application of the entity;
   receive the one or more configurable parameters; and
   integrate the configurable framework with the application, wherein the configurable framework processes one or more multi-channel electronic requests associated with the application based on the one or more configurable parameters.

2. The system of claim 1, wherein processing the one or more multi-channel requests comprises:
   receiving the electronic resource associated with an electronic request from at least one channel, wherein the electronic resource is associated with the application of the entity;
   in response to receiving the electronic resource, indexing the electronic resource;
   identifying the one or more configurable parameters associated with the application;
   processing the electronic resource based on the one or more configurable parameters;
   identifying that the electronic resource is associated with an existing electronic request based on processing the electronic resource;
   in response to identifying that the electronic resource is associated with the existing electronic request, routing the electronic resource to an associate processing the existing electronic request; and
   automatically pushing updates associated with the electronic resource to one or more entity systems of the entity.

3. The system of claim 2, wherein the configurable framework is configured for:
   identifying that processing of the electronic resource is unsuccessful; and
   in response to identifying that the processing of the electronic resource is unsuccessful, generating a data exception and retry processing the electronic resource.

4. The system of claim 1, wherein processing the electronic resource comprises:
   identifying that the first flag for the optical character recognition is positive;
   performing the optical character recognition on the electronic resource;
   calculating the confidence level of the optical character recognition;

determining that the confidence level for the optical character recognition is below the threshold value;
in response to determining that the confidence level is below the threshold value, identifying that the second flag for the manual review is positive; and
routing the electronic resource to the associate for the manual review.

5. The system of claim 1, wherein the one or more configurable parameters are received from an associate associated with the application, wherein the one or more configurable parameters are specific to the application.

6. The system of claim 1, wherein the one or more processing devices are configured to execute the computer readable code to integrate the configurable framework with any existing applications of the entity.

7. A computer program product for processing multi-channel electronic requests, the computer program product comprising at least one non-transitory computer-readable medium having computer-readable program code portions embodied therein, the computer-readable program code portions comprises one or more executable portions for:
generating a configurable framework;
creating a package of the configurable framework, wherein the package comprises one or more codes;
allowing a resource entity system of an entity to download the configurable framework;
identifying initiation of download of the configurable framework;
causing a user interface to prompt input of one or more configurable parameters associated with an application present in the resource entity system, wherein the one or more configurable parameters comprise:
a first flag for optical character recognition;
a threshold value for confidence level associated with the optical character recognition; and
a second flag for manual review of an electronic resource associated with the application of the entity;
receiving the one or more configurable parameters; and
integrating the configurable framework with the application, wherein the configurable framework processes one or more multi-channel electronic requests associated with the application based on the one or more configurable parameters.

8. The computer program product of claim 7, wherein processing the one or more multi-channel requests comprises:
receiving the electronic resource associated with an electronic request from at least one channel, wherein the electronic resource is associated with the application of the entity;
in response to receiving the electronic resource, indexing the electronic resource;
identifying the one or more configurable parameters associated with the application;
processing the electronic resource based on the one or more configurable parameters;
identifying that the electronic resource is associated with an existing electronic request based on processing the electronic resource;
in response to identifying that the electronic resource is associated with the existing electronic request, routing the electronic resource to an associate processing the existing electronic request; and
automatically pushing updates associated with the electronic resource to one or more entity systems of the entity.

9. The computer program product of claim 8, wherein the configurable framework is configured for:
identifying that processing of the electronic resource is unsuccessful; and
in response to identifying that the processing of the electronic resource is unsuccessful, generating a data exception and retry processing the electronic resource.

10. The computer program product of claim 7, wherein processing the electronic resource comprises:
identifying that the first flag for the optical character recognition is positive;
performing the optical character recognition on the electronic resource;
calculating the confidence level of the optical character recognition;
determining that the confidence level for the optical character recognition is below the threshold value;
in response to determining that the confidence level is below the threshold value, identifying that the second flag for the manual review is positive; and
routing the electronic resource to the associate for the manual review.

11. The computer program product of claim 7, wherein the computer-readable program code portions comprises one or more executable portions for integrating the configurable framework with any existing applications of the entity.

12. A computer implemented method for processing multi-channel electronic requests, the method comprises:
generating a configurable framework;
creating a package of the configurable framework, wherein the package comprises one or more codes;
allowing a resource entity system of an entity to download the configurable framework;
identifying initiation of download of the configurable framework;
causing a user interface to prompt input of one or more configurable parameters associated with an application present in the resource entity system, wherein the one or more configurable parameters comprise:
a first flag for optical character recognition;
a threshold value for confidence level associated with the optical character recognition; and
a second flag for manual review of an electronic resource associated with the application of the entity;
receiving the one or more configurable parameters; and
integrating the configurable framework with the application, wherein the configurable framework processes one or more multi-channel electronic requests associated with the application based on the one or more configurable parameters.

13. The computer implemented method of claim 12, wherein processing the one or more multi-channel requests comprises:
receiving the electronic resource associated with an electronic request from at least one channel, wherein the electronic resource is associated with the application of the entity;
in response to receiving the electronic resource, indexing the electronic resource;
identifying the one or more configurable parameters associated with the application;
processing the electronic resource based on the one or more configurable parameters;
identifying that the electronic resource is associated with an existing electronic request based on processing the electronic resource;

in response to identifying that the electronic resource is associated with the existing electronic request, routing the electronic resource to an associate processing the existing electronic request; and automatically pushing updates associated with the electronic resource to one or more entity systems of the entity.

14. The computer implemented method of claim 13, wherein the configurable framework is configured to:

identify that processing of the electronic resource is unsuccessful; and in response to identifying that the processing of the electronic resource is unsuccessful, generate a data exception and retry processing the electronic resource.

15. The computer implemented method of claim 12, wherein processing the electronic resource comprises:

identifying that the first flag for the optical character recognition is positive;

performing the optical character recognition on the electronic resource;

calculating the confidence level of the optical character recognition;

determining that the confidence level for the optical character recognition is below the threshold value;

in response to determining that the confidence level is below the threshold value, identifying that the second flag for the manual review is positive; and routing the electronic resource to the associate for the manual review.

16. The computer implemented method of claim 12, wherein the one or more configurable parameters are received from an associate associated with the application, wherein the one or more configurable parameters are specific to the application.

17. The computer implemented method of claim 12, wherein the method further comprises integrating the configurable framework with any existing applications of the entity.

* * * * *